US012748878B2

(12) United States Patent
Fox-Epstein et al.

(10) Patent No.: US 12,748,878 B2
(45) **Date of Patent: *Sep. 29, 2026**

(54) ENCRYPTED INFORMATION RETRIEVAL

(71) Applicant: Google LLC, Mountain View, CA (US)

(72) Inventors: Eli Simon Fox-Epstein, Los Angeles, CA (US); Kevin Wei Li Yeo, New York, NY (US); Sarvar Patel, Montville, NJ (US); Raimundo Mirisola, Los Angeles, CA (US); Craig William Wright, Louisville, CO (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/896,152

(22) Filed: Sep. 25, 2024

(65) Prior Publication Data

US 2025/0013774 A1 Jan. 9, 2025

Related U.S. Application Data

(63) Continuation of application No. 18/008,554, filed as application No. PCT/US2022/033393 on Jun. 14, 2022, now Pat. No. 12,135,811.

(Continued)

(51) Int. Cl.
*G06F 21/62* (2013.01)

(52) U.S. Cl.
CPC ................................ *G06F 21/6218* (2013.01)

(58) Field of Classification Search
CPC ............. G06F 21/6218; G06F 21/6245; G06F 21/6227
See application file for complete search history.

(56) References Cited

U.S. PATENT DOCUMENTS

| | | | |
|---|---|---|---|
| 10,482,285 B2 | 11/2019 | Alberton et al. | |
| 10,691,754 B1 | 6/2020 | Defrawy et al. | |
| 2016/0070749 A1 | 3/2016 | Sharma et al. | |
| 2018/0019866 A1* | 1/2018 | Kerschbaum | H04L 9/0618 |

(Continued)

FOREIGN PATENT DOCUMENTS

| | | |
|---|---|---|
| CN | 104995632 A | 10/2015 |
| CN | 111083631 A | 4/2020 |

OTHER PUBLICATIONS

Ali et al., "Communication-Computation Trade-offs in PI" Cyptology ePrint Archive, Paper 1483, 2019, 21 pages.*

(Continued)

*Primary Examiner* — El Hadji M Sall
(74) *Attorney, Agent, or Firm* — Fish & Richardson P.C.

(57) ABSTRACT

Encrypted information retrieval can include generating a database that is partitioned into shards each having a shard identifier, and database entries in each shard that are partitioned into buckets having a bucket identifier. A batch of client-encrypted queries are received. The batch of client-encrypted queries are processed using a set of server-encrypted data stored in a database. The processing includes grouping the client-encrypted queries according to shard identifiers of the client-encrypted queries, executing multiple queries in the group of client-encrypted queries for the shard together in a batch execution process, and generating multiple server-encrypted results to the multiple queries in the group of client-encrypted queries. The multiple server-encrypted results for each shard are transmitted to the client device.

20 Claims, 5 Drawing Sheets

Related U.S. Application Data

(60) Provisional application No. 63/210,755, filed on Jun. 15, 2021.

(56) References Cited

U.S. PATENT DOCUMENTS

| | | | |
|---|---|---|---|
| 2018/0039628 | A1 | 2/2018 | Lavarene et al. |
| 2018/0300415 | A1* | 10/2018 | Rehurek ............. G06F 16/2237 |
| 2019/0147170 | A1 | 5/2019 | Keselman et al. |
| 2019/0318356 | A1 | 10/2019 | Martin et al. |
| 2019/0325082 | A1 | 10/2019 | Laine et al. |
| 2019/0340381 | A1* | 11/2019 | Yavuz ................... G06F 21/606 |
| 2020/0117637 | A1 | 4/2020 | Roy et al. |
| 2020/0372163 | A1 | 11/2020 | Chung |
| 2020/0387615 | A1* | 12/2020 | Yeo ......................... G06F 3/064 |
| 2021/0111876 | A1 | 4/2021 | Gallancy et al. |

OTHER PUBLICATIONS

Brakerski et al., "Fully homomorphic encryption from ring-LWE and security for key dependent messages." Advances in Cryptology—CRYPTO 2011: 31st Annual Cryptology Conference, Santa Barbara, CA, USA, Aug. 14-18, 2011. Proceedings 31. Springer Berlin Heidelberg, Aug. 2011, 20 Pages.*

Brakerski et al., "Fully Homomorphic Encryption without Bootstrapping." Cryptology ePrint Archive 277, 2011, 27 pages.*

Github.com [online], "private-join-and-compute" Jun. 2019, retrieved on Feb. 3, 2023, retrieved from URL <https://github.com/google/private-join-and-compute>, 5 pages.*

Github.com [online], "shell-encryption" Sep. 2017, retrieved on Feb. 3, 2023, retrieved from URL <https://github.com/google/shell-encryption>, 8 pages.*

International Search Report and Written Opinion in International Appln. No. PCT/US2022/033393, mailed on Oct. 14, 2022, 12 pages.*

International Preliminary Report on Patentability in International Appln. No. PCT/US2022/033393, mailed on Dec. 28, 2023, 7 pages.*

Ali et al., "Communication-Computation Trade-offs in PI" Cryptology ePrint Archive, Paper 1483, 2019, 21 pages.

Extended European Search Report in European Appln. No. 24201196.3, mailed on Nov. 4, 2024, 9 pages.

Trieu et al., "Epione: Lightweight Contact Tracing with Strong Privacy" CoRR, Submitted on May 2020, arXiv:2004.13293v3, 32 pages.

Office Action in Indian Appln. No. 202327068212, mailed on Jun. 20, 2025, 8 pages (with English translation).

Office Action in Chinese Appln. No. 202280030960.5, mailed on Jul. 21, 2026, 24 pages (with English translation).

* cited by examiner

ENCRYPTED INFORMATION RETRIEVAL

CROSS-REFERENCE TO RELATED APPLICATION

This application is a continuation application and claims priority under 35 U.S.C. § 120 to U.S. patent application Ser. No. 18/008,554, filed on Dec. 6, 2022, which is a National Stage Application under 35 U.S.C. § 371 and claims the benefit of International Application No. PCT/US2022/033393, filed on Jun. 14, 2022, which claims the benefit under 35 U.S.C. § 119(e) of priority to U.S. Application No. 63/210,755, filed on Jun. 15, 2021. The disclosure of the prior applications are considered part of and are incorporated by reference in the disclosure of this application.

BACKGROUND

This specification relates to data processing and information retrieval. In particular, the techniques and methods described in this specification describe a technique for implementing private information retrieval (PIR) from databases.

User devices and content platforms such as content distributors can query content providers in order to retrieve information stored by the content providers. However, there can be situations when it is not in the interest of the content platforms to reveal any details to the content providers about what information is being queried. In other situations, it may not be in the interest of the content providers to reveal any details to the content platforms about other information that is stored on the computing systems of the content providers.

SUMMARY

In general, one innovative aspect of the subject matter described in this specification can be embodied in methods that include the actions of generating a partitioned database in which a database is partitioned into shards each having a shard identifier that logically distinguishes each shard from other shards, and database entries in each shard are partitioned into buckets having a bucket identifier that logically distinguishes each bucket in the shard from other buckets in the shard; receiving, by the server including one or more processors and from a client device, a batch of client-encrypted queries, wherein the batch of client-encrypted queries includes two or more queries that have each been encrypted by the client device and specify a shard identifier for the client-encrypted query; processing, by the server, the batch of client-encrypted queries using a set of server-encrypted data stored in a database, wherein each database entry is server-encrypted and is capable of being decrypted by a corresponding decryption key, wherein the processing includes: grouping, by the server, the client-encrypted queries according to shard identifiers of the client-encrypted queries, wherein each group of client-encrypted queries includes multiple queries; executing, by the sever and for each shard, the multiple queries in the group of client-encrypted queries for the shard together in a batch execution process; and generating, by the server and for each shard, multiple server-encrypted results to the multiple queries in the group of client-encrypted queries and transmitting, by the server, the multiple server-encrypted results for each shard to the client device.

Other implementations of this aspect include corresponding apparatus, systems, and computer programs, configured to perform the aspects of the methods, encoded on computer storage devices. These and other implementations can each optionally include one or more of the following features.

Methods can include receiving a set of client-encrypted entity identifiers; encrypting, by the server, the set of client-encrypted entity identifiers to create a set of sever-client-encrypted identifiers; and transmitting, by the server, the set of server-client-encrypted identifiers to the client device.

Methods can also include generating, by the client device, a set of queries using the set of server-client-encrypted identifiers; generating, by the client device, a set of decryption keys using the set of server-client-encrypted identifiers; encrypting, by the client device, the set of queries to create the batch of client-encrypted queries.

Methods can include encrypting, by the server, a set of data stored in the database, wherein, for a plurality of entries in the database, each database entry is server-encrypted and is capable of being decrypted by a corresponding decryption key, wherein generating the partitioned database includes assigning each server-encrypted database entry to a bucket.

Methods can include applying, by the client device, the set of decryption keys generated by the client device using the set of server-client-encrypted identifiers to the multiple server-encrypted results to reveal unencrypted results to the client-encrypted queries.

Methods can include generating the partitioned database by partitioning each bucket into smaller chunks.

Methods can also include executing the multiple queries by executing each query on each chunk of the bucket, which reduces CPU usage and response time by shrinking the search space for each query execution.

The subject matter described in this specification can be implemented in particular embodiments so as to realize one or more of the following advantages. The techniques and methods described in this specification describe techniques for retrieving data from databases while preserving both client and server privacy. This allows a client to query a server without revealing any details to the server about the data that is being queried. Simultaneously, when the client is querying the server does not reveal any details regarding contents of the database that are not queried by the client. In contrast existing techniques of querying a server generally includes encrypting the entire server database and providing the encrypted database to the client for querying. This approach requires significantly more computational resources since the size of the database is generally large. Other approaches of querying the server includes providing an index of the database to the client and receiving a selection of indexes from the client that does not allow for server and client privacy The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

This specification relates to data processing and information retrieval. In particular, the techniques and methods described in this specification describe techniques for retrieving data from databases while preserving both client and server privacy. For example, if the client queries a server database, the client does not reveal any details to the server about the data that is being queried (also referred to as client query privacy). Simultaneously the server does not reveal to the client any details regarding contents of the database that are not queried by the client (also referred to as server database privacy). These techniques enable batch processing of queries to provide for a more efficient information retrieval system that also protects user privacy. For example, user privacy is protected by ensuring that a server being queried cannot learn information about the users that a client is querying the server about, and also prevents the client from learning other information about the users that may be stored by the server.

Figure 1:
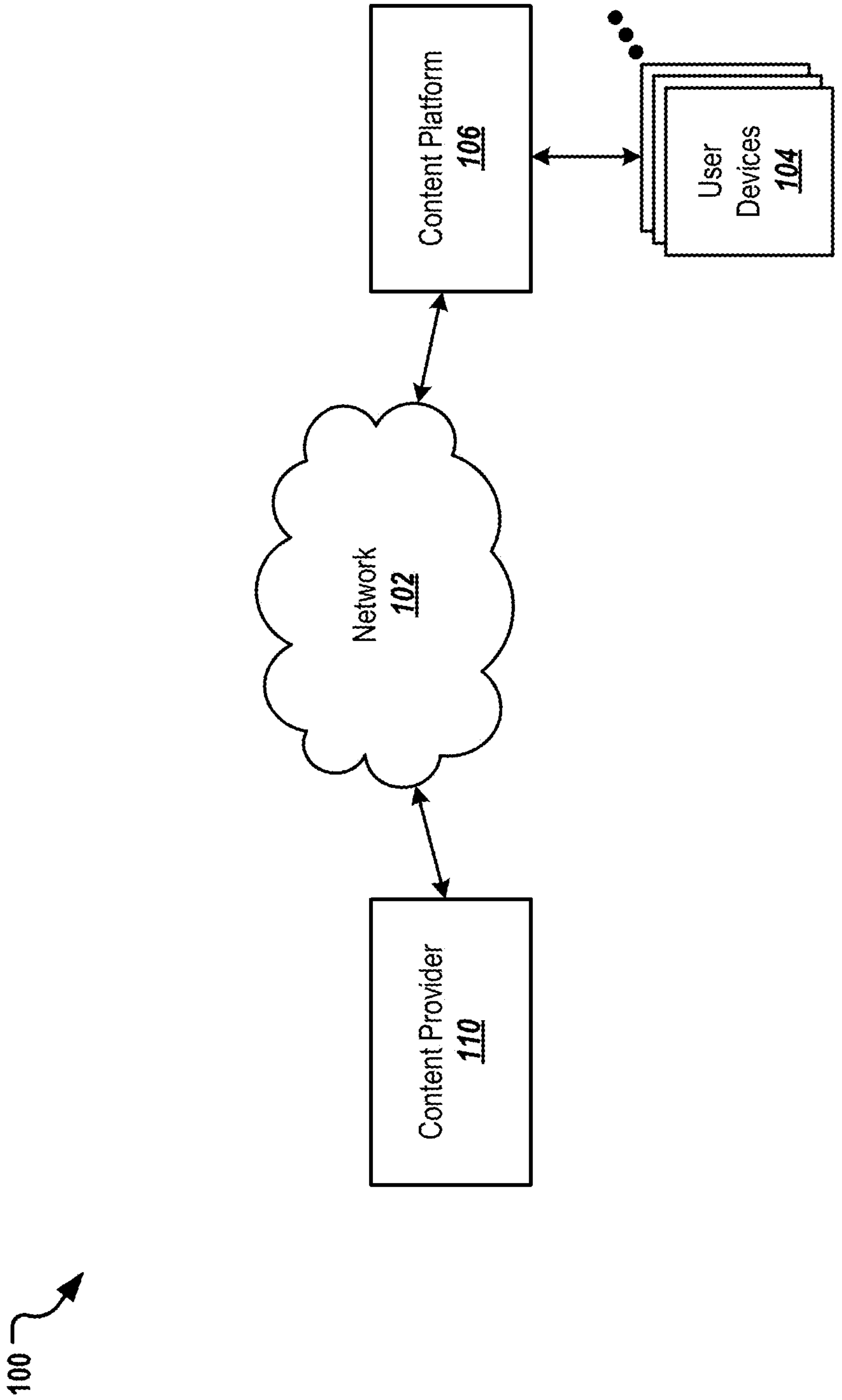
FIG. 1 is a block diagram of an example environment in which content is distributed and presented to a user device.

FIG. 1 is a block diagram of an example environment 100 in which content is distributed and presented to a user device. The example environment 100 includes a network 102, such as a local area network (LAN), a wide area network (WAN), the Internet, or a combination thereof. The network 102 connects content platforms 106, and content providers 110. The example environment 100 may include many different content providers 110, content platforms 106, and user devices 104.

A user device 104 is an electronic device that is capable of requesting and receiving content over the network 102. Example user devices 104 include personal computers, mobile communication devices, digital assistant devices, and other devices that can send and receive data over the network 102. A user device 104 typically includes an operating system 112 that is primarily responsible for managing the device hardware and software resources such as applications. The user device 104 also includes a device storage 120 to store data temporarily or permanently based on the particular implementation, application, and use case. A user device 104 typically includes user applications 116 and 117, such as a web browser or an email client, to facilitate the sending and receiving of data over the network 102, but native applications executed by the user device 104 can also facilitate the sending and receiving of content over the network 102. Examples of content presented at a user device 104 include webpages, word processing documents, portable document format (PDF) documents, images, videos, and search results pages and digital ads.

A content platform 106 is a computing platform that enables distribution of content. Example content platforms 106 include search engines, social media platforms, news platforms, data aggregator platforms, or other content sharing platforms. Each content platform 106 may be operated by a content platform service provider. The content platform 106 may present content provided by one or more content providers 110. In the above example, the news platform may present content created by different authors and provided by one or more content providers 110. As another example, the content platform 106 may be a data aggregator platform that does not publish any of its own content, but aggregates and presents news articles provided by different news websites (i.e., content providers 110).

In some implementations, the content platform 106 can distribute digital content to one or more users. For example, the content platform 106 can let one or more users subscribe to and/or register with the content platform 106. In response, the content platform 106 can retrieve digital content from the content providers 110 and provide the retrieved content to the user devices 104 of users. The content provider 110 includes a data storage device (also referred to as a database) that stores digital content in the form of key-value pairs. For example, the database of the content provider 110 can include multiple keys and for each key, a corresponding value that is retrieved by the content platform 106.

In some implementations, the content platform 106 can assign an identifier to each user so that the content platform can distinguish between the users. In some implementations, the content platform 106 can use information provided by the one or more users and/or the user devices as the unique identifier. For example, the content platform 106 can use, as the unique identifier, an electronic mail identifier (email id) provided by a user, a cell phone number provided by a user, or a media access control (MAC) address of the user device 104 of the user. In some implementations, the content platform 106 can assign an identifier to a group of two or more users based on the characteristics of the users in the group of users. For example, the content platform 106 can assign to a group of users a common identifier based on similar interests in the context of digital content accessed by the users. In another example, users can be assigned to a group and can be assigned a common identifier based on the subscriptions with the digital content. In some implementations, the content platform 106 can assign multiple identifiers to a single user. For example, the content platform 106 can assign both email id and a cell phone number as an identifier for a user.

To retrieve digital content from the content providers 110, the content platform 106 and the content provider 110 implements an information retrieval technique that ensures data privacy in a way that the content platform 106 does not reveal any details to the content providers 110 about what information is being queried. The retrieval technique further ensures that the content providers 110 does not reveal any details to the content platforms 106 about other information that is stored on the computing systems of the content providers 110. While this specification refers to content providers 110 and content platforms 106, the information retrieval techniques discussed herein can be used by any two systems that want to exchange information in a privacy preserving manner. The information retrieval techniques are further explained with reference to FIG. 2, and entities that are requesting information from a database are referred to as clients and the entities that maintain the database of information, and return information stored in the database are referred to as servers.

Figure 2:
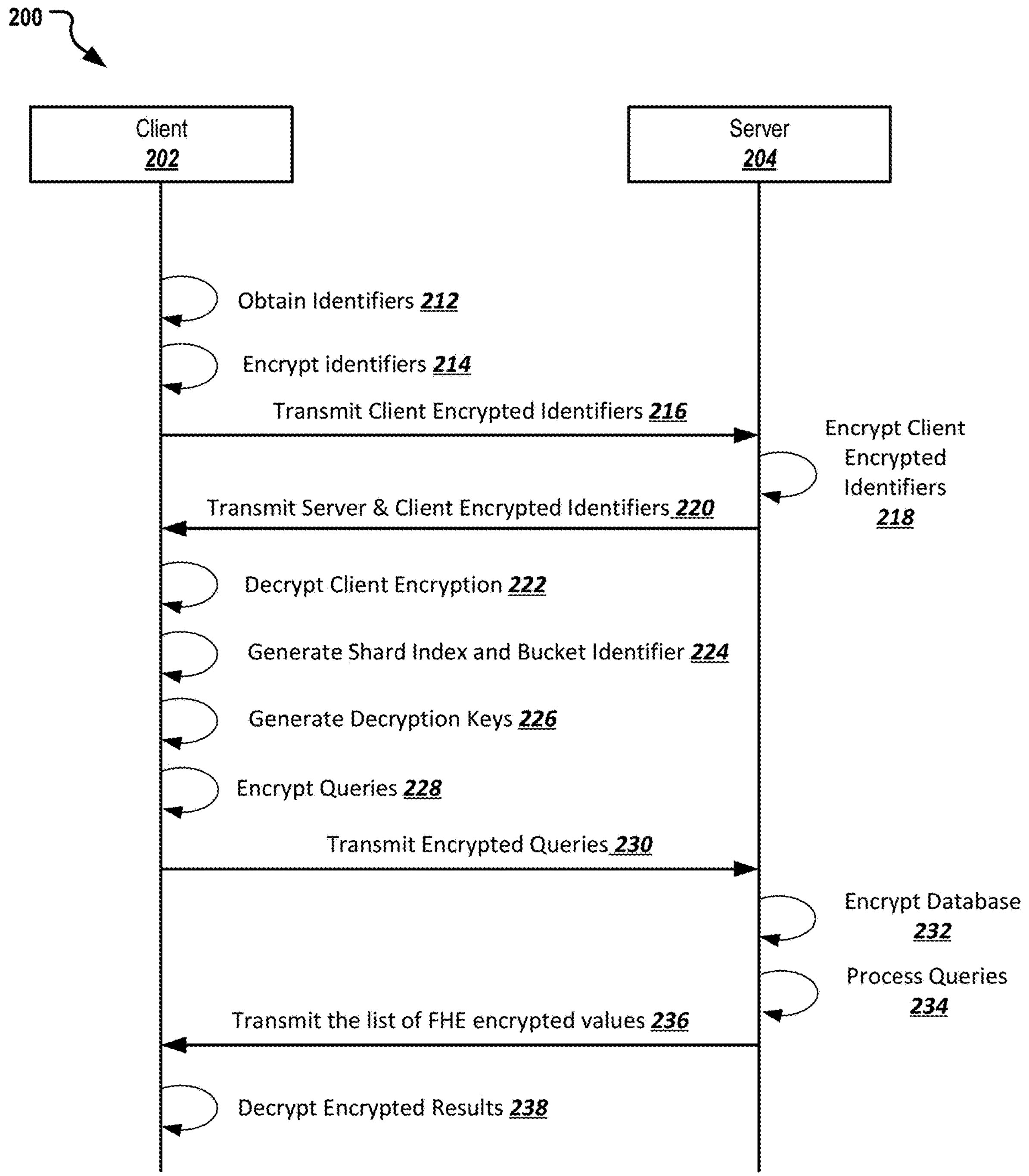
FIG. 2 is a swim lane diagram of an example process of retrieving content by a client from a server.

FIG. 2 is a swim lane diagram of an example process 200 of retrieving content by a client from a server. Operations of the process 200 can be implemented, for example, by the client 202 and the server 204. Operations of the process 200 can also be implemented as instructions stored on one or more computer readable media, which may be non-transitory, and execution of the instructions by one or more data processing apparatus can cause the one or more data processing apparatus to perform the operations of the process 200.

The server implements a database (also referred to as server database) that stores digital content in the form of a mapping between key and value (referred to as a key-value pair). A key can be an identifier and/or a pointer for a value that is the digital content that is being queried by the client. A database can include multiple keys and for each key a respective value corresponding to the key. For example, the server can include, in the database, multiple keys where each key can uniquely identify one or more users of the clients for which the client is retrieving content from the server.

In some implementations, the key of the key-value pair of the server database is associated with the identifier that was assigned to the users by the clients. While querying the server, the client provides the server with a query that includes the identifiers in a way that the details of the identifiers are not disclosed to the server. As explained further in the document, the server can select content (e.g., data of any kind) from the server database based on the identifier even though the identifiers are masked from the server.

The client 202 obtains unique identifiers (212). For example, the client 202 can provide digital content to one or more users. To uniquely identify the one or more users, the client 202 can assign an identifier to each of the one or more users. In some implementations, the client 202 can use information provided by the one or more users and/or the user devices 104 as the identifiers for the one or more users and/or user devices 104. For example, the client 202 can use, as a unique identifier, an electronic mail identifier (email-id or email address), cell phone number, or media access control (MAC) address of the user devices 104. The client can be any computing system that requests information from another system (e.g., a server system) that stores information or maintains a database.

The client 202 device encrypts the identifiers (214). To prevent the server 204 from accessing the identifiers of the users in plaintext, the client 202 encrypts the identifiers using a deterministic and commutative encryption technique to generate an encrypted form of the identifiers (referred to as "client encrypted identifiers"). In general, a commutative encryption is a kind of an encryption that enables a plaintext to be encrypted more than once using different entity's public keys. In this system, decryption is not required before the encryption/re-encryption processes. Moreover, the resulting ciphertext (also referred to as encrypted text) can be decrypted by the designated decryption techniques without considering the order of public keys used in the encryption/re-encryption processes. In other words, the order of keys used in encryption and in decryption do not affect the computational result, and allow one encrypting party (e.g., a client 202) to remove their encryption even after another party (e.g., a server) has applied further encryption to data that was encrypted by the first encrypting party.

The client 202 transmits the client encrypted identifiers to the server 204 (216). For example, after encrypting the identifiers, the client 202 transmits the client encrypted identifiers to the server 204 over the network 102.

The server 204 encrypts the client encrypted identifiers (218). In some implementations, after receiving the client encrypted identifiers from the client 202, the server 204 re-encrypts (e.g., further encrypts) the client encrypted identifiers using a commutative encryption technique to generate an encrypted form of the client encrypted identifiers (referred to as "server & client encrypted identifiers"). In other words, the server 204 adds another layer of encryption on the client encrypted identifiers. Note that the server 204 does not have access to the identifiers in plaintext because the identifiers were already encrypted by the client 202, and the server 204 does not have the decryption key.

The server 204 transmits the server & client encrypted identifiers back to the client 202 (220). For example, after generating the server & client encrypted identifiers, the server 204 transmits the server & client encrypted identifiers of the one or more users to the client 202 over the network 102.

The client 202 removes the prior client encryption from the server & client encrypted identifiers (222). In some implementations, after receiving the server & client encrypted identifiers, the client 202 uses techniques to decrypt (or remove) the encryption that was performed by the client 202 in step 214 to generate "server encrypted identifiers" for each of the one or more users. Note that the client 202 is able to remove client encryption since the encryption techniques are commutative in nature. Also note that the server encrypted identifiers that are generated after removing the client encryption are identifiers encrypted by the server using the commutative and deterministic encryption technique. In other words, after the client 202 removes the original encryption that was applied to the identifiers, the identifiers remain encrypted by the server, and are then only server encrypted versions of the client identifiers, which are used by the client 202 to generate queries that will be submitted to the server 204 to request information corresponding to the identifiers.

In some implementations, steps 218-222 of the process 200 can be implemented using an oblivious pseudo random function (also referred to as an Oblivious PRF or OPRF). An Oblivious PRF is a protocol between a server holding a key to a pseudo random function (PRF) and a client holding an input. At the end of the server-client interaction, the client learns the output of the OPRF on its input provided by the client and nothing else. The server learns nothing about the client's input or the OPRF output.

To facilitate creation of the queries, the client 202 generates a shard index and a bucket identifier for each server encrypted identifier (224). In some implementations, the client 202 implements a hashing technique to generate a query that can include a shard index and a bucket identifier (also referred to as a bucket-id). An example hashing technique of generating the query is further explained with reference to FIG. 3.

Figure 3:
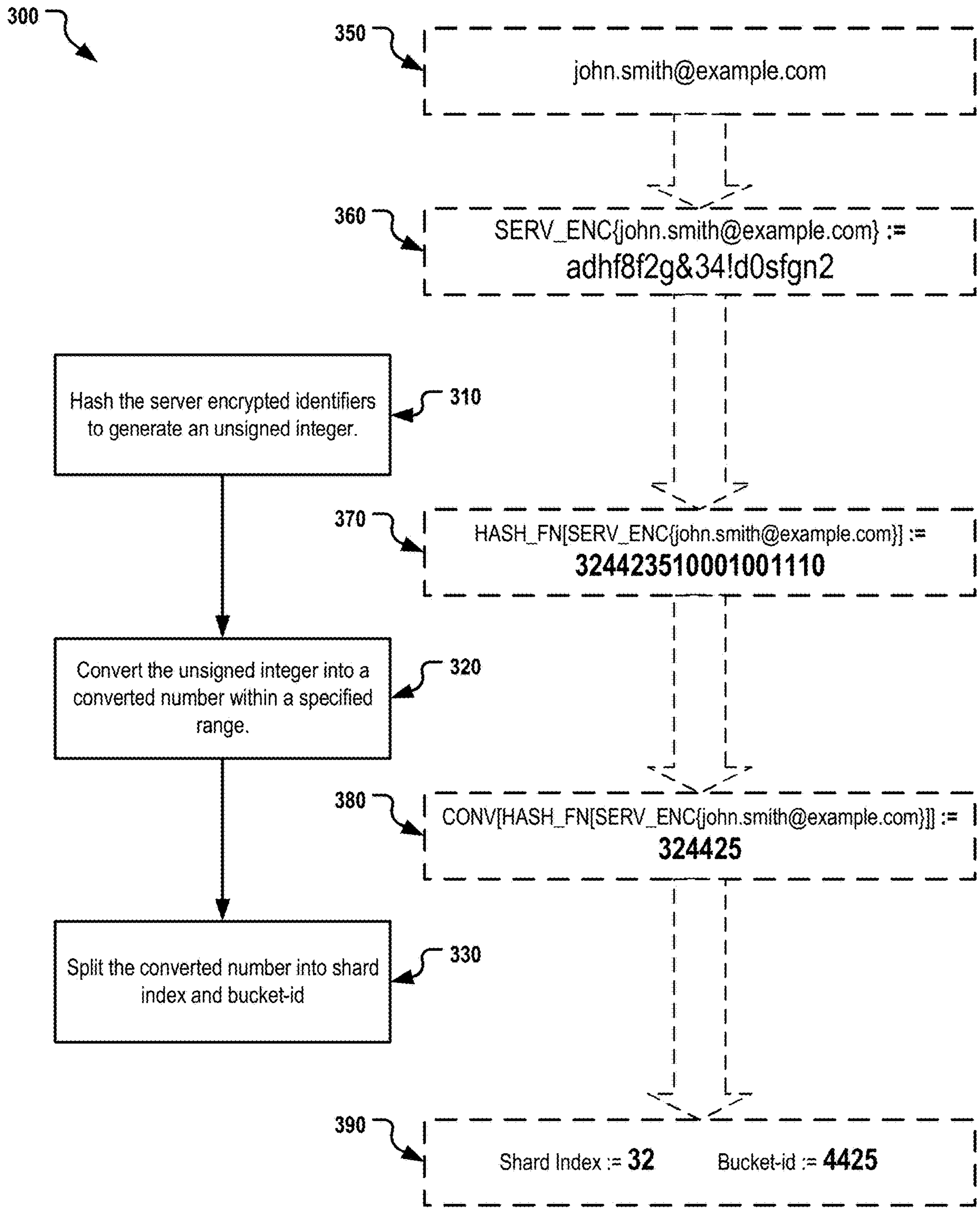
FIG. 3 is a flow diagram of an example process of generating a query from server encrypted identifiers.

FIG. 3 is a flow diagram of an example process 300 of generating a query from the server encrypted identifiers. Operations of the process 300 can be implemented, for example, by the client 202 that includes any entity that implements the techniques described in this document to retrieve content from another entity. Operations of the process 300 can also be implemented as instructions stored on one or more computer readable media which may be non-transitory, and execution of the instructions by one or more data processing apparatus can cause the one or more data processing apparatus to perform the operations of the process 300.

FIG. 3 explains the process 300 of generating a query using an example identifier 350 (john.smith@example.com). After processing the identifier 350 using steps 212 to 222 of the process 200, the server encrypted identifier 360 of the identifier 350 is represented as SERV_ENC{john.smith@example.com}:=adhf8f2g&34!d0sfgn2 where SERV_ENC is the server encryption of the server & client encrypted identifiers after the client 202 removes the client encryption of step 214 and "adhf8f2g&34!d0sfgn2" is the ciphertext of the identifier 350.

The client 202 hashes the server encrypted identifiers to generate an unsigned integer (310). In some implementations, the client 202 can implement a hash function that is configured to process the server encrypted identifier 360 to generate an unsigned integer 370. This can be represented as HASH_FN[SERV_ENC{john.smith@example.com}]:=32-4423510001001110 where HASH_FN is the hash function implemented by the client 202 and "324423510001001110" is the unsigned integer. The hash function (also referred to as a Cryptographic Hash Function) can be any one-way function which is practically infeasible to invert or reverse and that can be used to map data of arbitrary size to a fixed-size value. Examples of such hash functions can include MD5 message-digest algorithm, Secure Hash Algorithm 1, 2 and 3.

The client 202 converts the unsigned integer into a converted number that is within a specified range (320). In some implementations, the client 202 can implement a conversion function that is configured to process the unsigned integer 370 to generate a converted number 380 that is within a specified range. Since the hash function and the conversion function are known to both the client 202 and the server 204, the range of the converted number generated using the conversion function is pre-specified. In this example, the converted number 380 is represented as CONV [HASH_FN[SERV_ENC{john.smith@example.com}]]:=3-2-4425 where CONV is the conversion function implemented by the client 202. As an example, one way to convert an unsigned integer into a number between 0 and 9999 is to use the remainder of the unsigned integer divided by 10000.

The client 202 splits the converted number into a shard index and a bucket-id (330). The shard index will be a number between 0 and P−1, where P is the number of shards. The bucket-id will range between 0 and n/P−1, where n is the largest value that the converted number 380 generated in step 320 can take. In some implementations, the client 202 splits the converted number 380 generated in step 320 into two parts such that the first part is the shard index and the second part is the bucket-id. For example, if n is the largest value that the converted number 380 can take, the number of bits required to represent the number n is $\log_2 n$ bits. In such a scenario, if P is a power of 2 where P=2K, the client 202 can use the first K bits as the shard index and the remaining, $\log_2 n-K$ bits can be used as a bucket-id. In this example, the client 202 splits the converted number 380 into two parts as depicted in FIG. 3 as result 390 such that the shard index is 32 and the bucket-id is 4425. In another implementation, if P represents the number of shards, the shard index can be computed as the remainder when the converted number is divided by P. In this case, the bucket-id can be computed as the integer quotient when the converted number is divided by P. In this case, if P=100 then shard index 25 and bucket-id 3244.

Returning back to the process 200, the client 202 uses the process 300 to generate a query for each of the server encrypted identifiers of the one or more users. For example, each query that is generated for each identifier will include the shard index and the bucket id created using the server encrypted identifier, as discussed above.

The client 202 generates decryption keys using each server encrypted identifier (226). In some implementations, the client 202 can generate a decryption key for each of the server encrypted identifiers. For example, the client 202 can implement a HMAC-based Extract-and-Expand Key Derivation Function (HKDF) which is a hash-based message authentication code (HMAC) cryptographic key derivation function (KDF) for expanding a key into one or more cryptographically strong secret keys. For example, the client 202 can use the HKDF to process the server encrypted identifier to generate a decryption key.

The client 202 generates and encrypts queries (228). In some implementations, the client 202 uses the bucket-id to generate an indicator vector of length n/P where the element with index equal to the bucket-id is 1 and the other elements are 0 (recalling that P is the number of shards and n/P is the number of distinct bucket-ids). In some implementations, the indicator vector can be compressed using well-known compression techniques. In some implementations, the client 202 can encrypt the indicator vector corresponding to each of the server encrypted identifiers using a fully homomorphic encryption (FHE) technique to generate a corresponding FHE encrypted bucket vector. In general, homomorphic encryption is a form of encryption that permits users to perform computations on its encrypted data without first decrypting it. These resulting computations are left in an encrypted form which, when decrypted, result in an identical output to that produced had the operations been performed on the unencrypted data. Properties of FHE can include addition, multiplication and absorption. To illustrate, if {x} denotes a FHE of x, then the addition {x}+{y} can yield {x+y} without revealing x, y or x+y. Similarly, the multiplication {x}*{y} can yield {xy} without revealing x, y or xy and the absorption {x}*y can yield {xy} without revealing x. In some implementations, the properties of FHE can include the ability to convert an encrypted vector into a specified number of separate encrypted values (one for each item in the vector) without revealing any details about the items in the vector.

After encrypting the indicator vector, the client 202 can generate a query that includes a shard index and a corresponding FHE encrypted bucket vector. The query can be denoted as FHE PIR QUERY (database, query) where database represents a data storage that stores a mapping of key and value i.e., the database stores multiple keys and for each key a corresponding value.

The client 202 transmits the query to the server 204 (230). For example, after generating the queries for each of the server encrypted identifiers, the client 202 transmits the queries to the server 204 over the network 102. In some implementations, multiple queries are sent to the server in a batch, such that the server can process the queries at the same time (e.g., in a batch process).

The server 204 encrypts the database (232). The server 204 can encrypt the database at any time prior to receipt of the query. For example, as the server 204 is building the database, or adding information to the database, the server can encrypt the data being stored in the database. In some implementations, the server 204 encrypts the server database using an encryption technique such as the Advanced Encryption Standard (AES). For example, the server 204 encrypts the value of each key-value pair of the server database using the AES encryption technique based on an AES-key generated using the HKDF and the corresponding key of the key-value pair. Each key of the key-value pair of the server database is further replaced by an integer (referred to as a record key) that is generated using a hash function (e.g., SHA256) that maps the key to an integer within the range [0, n) where n is a tunable parameter known to both the server 204 and the client 202. This results in a record key-AES encrypted value pair in place of each of the key-value pair in the database.

The hash function can further utilize cryptographic salt that is made up of random bits added to each key of the key-value pair before hashing. In some implementations, the cryptographic salt is also known to the client 202 that can be used by the client 202 while encrypting the indicator vector using FHE technique to generate a corresponding FHE encrypted bucket vector.

The server 204 processes the queries (234). In some implementations, the server 204 can process the queries using an optimized batch process that reduces the resource consumption required to retrieve content from the database. The optimized process can be implemented in a manner that facilitates concurrent processing by splitting the database into smaller chunks (referred to as shards and identified using shard index), and processing them in parallel on multiple computing systems thereby reducing the computational resources required to retrieve content from the database. This is further explained with reference to FIG. 4.

Figure 4:
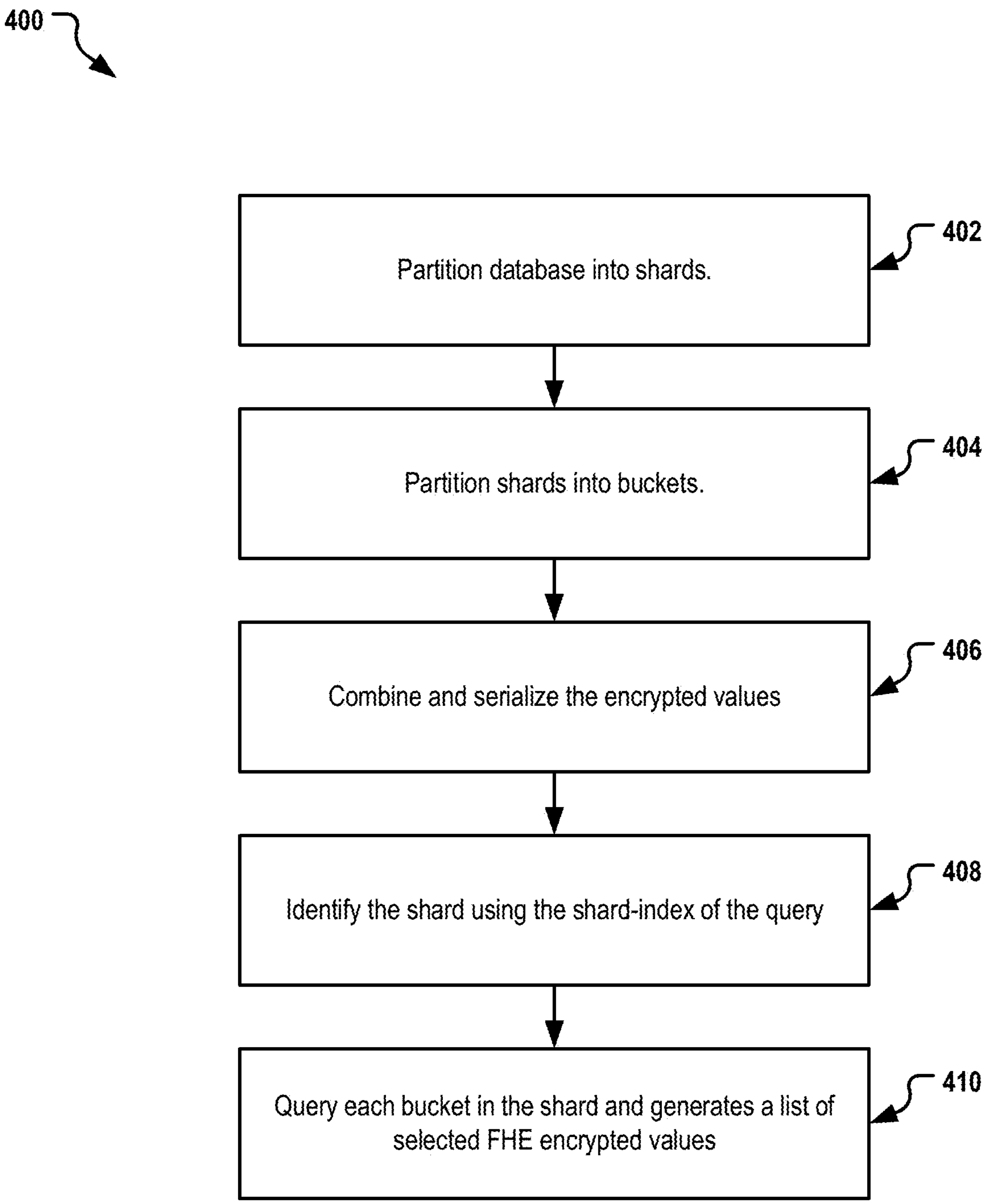
FIG. 4 is a flow diagram of an example process of processing queries by a server.

FIG. 4 is a flow diagram of an example process 400 of processing queries. Operations of the process 400 can be implemented, for example, by the server 204 that includes any entity that implements a database from where content is being retrieved. Operations of the process 400 can also be implemented as instructions stored on one or more computer readable media which may be non-transitory, and execution of the instructions by one or more data processing apparatus can cause the one or more data processing apparatus to perform the operations of the process 400.

The server 204 partitions the database into P shards (402). For example, by deriving shard indexes from record keys by using the same technique used by the client to derive shard indexes. Each shard may include multiple record key-AES encrypted value pairs.

The server 204 partitions each shard into buckets (404). In some implementations, the server 204 partitions each shard into even smaller partitions called buckets by deriving a bucket-id for each record key in a shard using the same technique that the client used. For example, shard index and the bucket-id can be computed as the remainder and the integer quotient respectively when the converted number is divided by P. Observe that this yields at most n/P buckets per shard.

After partitioning each shard into multiple buckets, the AES encrypted values of the record key-AES encrypted value pairs are stored inside each bucket such that the record key of the record key-AES encrypted value pairs indexes both the shard and the bucket inside the shard. It should be noted that the server 204 uses the same methodology as the client 202 to derive a shard number and bucket-id from each key of the key-value pair in the server database.

The server 204 combines and serializes the encrypted values (406). In some implementations, the server 204 concatenates the AES encrypted values of each bucket into a bytestring. For example, if a particular bucket includes 3 AES encrypted values, the 3 AES encrypted values are concatenated one after the other to generate a bytestring. The server 204 identifies the offset values (index location of the bytestring) of the AES encrypted values and encrypts the offset values using an encryption technique such as AES based on the corresponding record keys. For example, if the bytestring includes 3 AES encrypted values of uniform length, the server encrypts the offset values of each of the 3 AES encrypted values in the bytestring using AES based on the respective record key of the record key-AES encrypted value pair. After generating the encrypted offset values, the server 203 prepends the encrypted offset values to the bytestring. The server 204 further prepends the number of AES encrypted values to the bytestring. In this example, the server 204 prepends the value 3 to the bytestring. The server 204 further splits the bytestring into chunks of c bytes each where c is an integer known in advance to both the client and the server. The c-byte chunks can be further indexed based on their relative position in the bytestring. For example, if c=1, a bucket B can be represented as B=["p","q","r","s" ] where "pqrs" can be the bytestring that is split into c-byte chunks "p", "q", "r" and "s" having indices 1-4 in the bucket respectively. In another example, if c=2, a bucket B can be represented as B=["pq","rs","tu","v" ] where "pqrstuv" can be the bytestring that is split into c-byte chunks "pq", "rs", "tu" and "v" having indices 1-4 in the bucket respectively.

For each query, the server 204 identifies the shard using the shard-index of the query (408). As mentioned before with reference to step 228 of the process 200, each query includes a shard index and a corresponding FHE encrypted bucket vector. After receiving a query, the server 204 identifies a particular shard based on the shard index of the query. For example, if the shard index of the query is 32, the server identifies the 32nd shard based on the shard indexes of the server database.

For each query, the server 204 queries each bucket in the shard and generates a list of FHE encrypted values (410). In some implementations, the server 204 queries each bucket of the particular shard identified by the shard index using the FHE encrypted bucket vector from the query. For example, if there are 32 buckets in a shard that was identified using the shard-index from the query, the server 204 will query each of the 32 buckets.

In order to query a bucket, the server 204 performs an oblivious expansion operation on the FHE encrypted bucket vector from the query to obtain an FHE encrypted value for the particular bucket. Then it performs a separate FHE absorption operation between the FHE encrypted value for the particular bucket and each c-byte chunk in the bucket. This can be logically explained with the following example.

Assume that there are 4 buckets in the particular shard. Further assume that the 1st bucket has the following chunks ["A", "B", "C", "D" ]. Similarly the 2nd, the 3rd and the 4th bucket has the following chunks ["E", "F", "G" ], ["H" ] and ["I", "J", "K" ] respectively. Further assume that the indicator vector is [0, 1, 0, 0]. An absorption operation will generate FHE encrypted values of chunks with index 1 across all four buckets that can be represented as [0, "E", 0, 0]. Similarly FHE encrypted values of chunks with indices 2-4 across all four buckets are [0, "F", 0, 0], [0, "G", 0, 0] and [0, 0, 0, 0] respectively.

In some implementations, the server 204 can aggregate the values of the FHE encrypted values of the bucket vector and the c-byte chunks using the FHE addition operation across all buckets and generate a list of FHE encrypted values. In other words, all entries in the set of triples described previously with the same query and chunk_index are combined into one by summing the FHE values. For example, the aggregation operation on the values of the FHE encrypted values of the bucket vector and the c-byte chucks with a particular index, for example, index 1 will select the chunk "E" from among all chunks having index 1 across all four buckets of the shard. Similarly the aggregated values of the chunks at the 2nd, the 3rd and the 4th indices are "F","G" and 0 respectively across all buckets of the shard. The server 204 after selecting the chunks from buckets, the server 204 can generate a list of FHE encrypted values and transmits the list to the client 202. For example, the server can generate a list ["E", "F", "G" ] of FHE encrypted values that were selected using the absorption operation and transmit the list to the client 202.

Even though the process 400 has been explained with reference to a single query, the process 400 can be implemented in a way that multiple queries can be processed in parallel on multiple computing systems. In some implementations, a map reduce process can be used that enables all queries to be processed as a batch of queries, which reduces the time required to generate a response to the queries, and saves processing resources relative to processing each query individually. For example, assume that the database is partitioned into n buckets by hashing keys and that the buckets are partitioned into shards based on leading k bits. In this example, the server can partition the queries by shard based on the provided shard index that is submitted with each query. The server can then fan out each query to an FHE value per (existing) bucket in its shard by decompressing the encrypted bucket selector. Within each shard, each bucket is joined with the FHE values from the queries for the bucket. For each bucket: for each pair in the cartesian product of FHE values from queries and chunks of the bucket, perform an FHE absorption. The output of this step is a multimap from (query_id, chunk_index) pairs to FHE-encrypted values. The values are aggregated using FHE addition as the aggregator. This has the same output format as the previous step, except that it's not a multimap—each key has exactly one FHE value. A list of encrypted values sorted by chunk_index is aggregated, and the output format is a map from query to a list of FHE-encrypted values. By providing the same number of queries per shard and with appropriate sharding, the computational costs can be reduced by having many shards without revealing any information about the distribution of queries. Now returning back to FIG. 2.

The server 204 transmits the list of FHE encrypted values to the client 202 (236). The server 204 after generating the list of FHE encrypted values of the bucket vector and the c-byte chunks for each of the server encrypted identifiers, transmits the one or more lists to the client 202 over the network 102.

The client 202 decrypts the FHE encryption (238). In some implementations, after receiving the one or more lists of FHE encrypted values of the bucket vector and the c-byte chunks, the client 202 uses the decryption keys that were generated in step 226 of the process 200 to decrypt the FHE encryption from each of the lists to obtain the value of the key-value pair that was queried and was originally stored on the server database if it exists.

In some implementations, the values of n and P can be tuned for further optimization. For example, increasing the value of P saves computation time of the server 204 but at the same time increases the burden of the client 202 to generate more queries. To compensate for additional queries for a larger value of P, a client 202 can generate fake queries that do not select data from the server database.

In situations, when fake queries present the issue of a malicious client using additional queries to learn about other data that is stored in the server database, the server 204 can ensure that the client 202 is only sent a result per real query, rather than the fake queries. In some implementations, this can be achieved by utilizing an additional PIR protocol on top of the results, rather than sending the full results to the client 202. In some implementations, this may be very efficient because even with a large number of fake queries, the number of fake queries is orders of magnitude smaller than the server database.

In some implementations, it may be optimal to set the number of shards to equal the number of queries. By using techniques such as relative Chernoff Bounds and Union Bounds, the number of fake queries can be determined. For some implementations, for example, it may be optimal to have around 40-50 fake queries per real query when there are around 10,000 queries.

Figure 5:
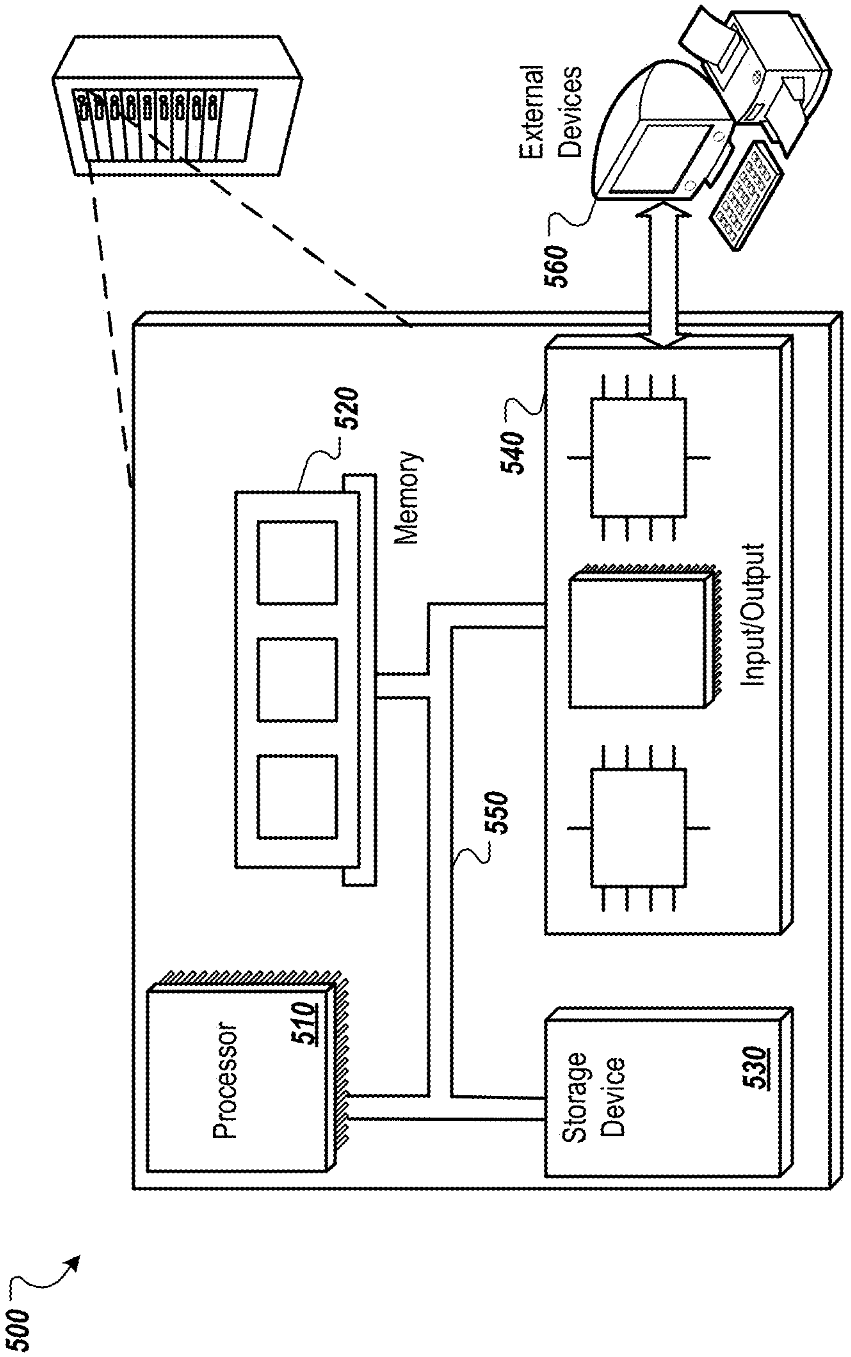
FIG. 5 is a block diagram of an example computer system.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In some implementations, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 560, e.g., keyboard, printer and display devices. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:

generating a partitioned database in which a database is partitioned into shards each having a shard identifier that logically distinguishes each shard from other shards, and database entries in each shard are partitioned into buckets having a bucket identifier that logically distinguishes each bucket in the shard from other buckets in the shard;

receiving, by a server including one or more processors and from a client device, a batch of client-encrypted queries;

processing, by the server, the batch of client-encrypted queries using a set of server-encrypted data stored in a database to obtain a set of server-encrypted results to the batch of client-encrypted queries;

determining, by the server, that the batch of client-encrypted queries includes fake queries and real queries; and transmitting, by the server and to the client device, server-encrypted results for the real queries rather than the fake queries.

2. The method of claim 1, further comprising:

receiving, from the client device, a set of client-encrypted entity identifiers;

encrypting, by the server, the set of client-encrypted entity identifiers to create a set of server-client-encrypted identifiers;

transmitting, by the server, the set of server-client-encrypted identifiers to the client device.

3. The method of claim 2, further comprising:

generating, by the client device, a set of queries using the set of server-client-encrypted identifiers;

generating, by the client device, a set of decryption keys using the set of server-client-encrypted identifiers;

encrypting, by the client device, the set of queries to create the batch of client-encrypted queries.

4. The method of claim 3, further comprising:

encrypting, by the server, a set of data stored in the database, wherein, for a plurality of entries in the database, each database entry is server-encrypted and is capable of being decrypted by a corresponding decryption key, wherein generating the partitioned database includes assigning each server-encrypted database entry to a bucket.

5. The method of claim 4, further comprising:

applying, by the client device, the set of decryption keys generated by the client device using the set of server-client-encrypted identifiers to the set of server-encrypted results to reveal unencrypted results to the client-encrypted queries.

6. The method of claim 4, wherein generating the partitioned database further comprises partitioning each bucket into smaller chunks.

7. The method of claim 6, wherein processing the batch of client-encrypted queries comprises executing each query among the batch of client-encrypted queries on each chunk of the bucket, which reduces CPU usage and response time by shrinking a search space for each query execution.

8. A system comprising:

a memory device; and a server, including one or more processors, configured to execute instructions that cause the server to perform operations comprising:

generating a partitioned database in which a database is partitioned into shards each having a shard identifier that logically distinguishes each shard from other shards, and database entries in each shard are partitioned into buckets having a bucket identifier that logically distinguishes each bucket in the shard from other buckets in the shard;

receiving, from a client device, a batch of client-encrypted queries;

processing the batch of client-encrypted queries using a set of server-encrypted data stored in a database to obtain a set of server-encrypted results to the batch of client-encrypted queries;

determining that the batch of client-encrypted queries includes fake queries and real queries; and transmitting, to the client device, server-encrypted results for the real queries rather than the fake queries.

9. The system of claim 8, wherein the instructions cause the server to perform operations further comprising:

receiving, from the client device, a set of client-encrypted entity identifiers;

encrypting the set of client-encrypted entity identifiers to create a set of sever-client-encrypted identifiers;

transmitting the set of server-client-encrypted identifiers to the client device.

10. The system of claim 9, wherein the instructions cause performance of operations further comprising:

generating a set of queries using the set of server-client-encrypted identifiers;

generating a set of decryption keys using the set of server-client-encrypted identifiers;

encrypting the set of queries to create the batch of client-encrypted queries.

11. The system of claim 10, wherein the instructions cause the server to perform operations further comprising:

encrypting a set of data stored in the database, wherein, for a plurality of entries in the database, each database entry is server-encrypted and is capable of being decrypted by a corresponding decryption key, wherein generating the partitioned database includes assigning each server-encrypted database entry to a bucket.

12. The system of claim 11, wherein the instructions cause performance of operations further comprising:

applying the set of decryption keys generated by the client device using the set of server-client-encrypted identifiers to the set of server-encrypted results to reveal unencrypted results to the client-encrypted queries.

13. The system of claim 11, wherein generating the partitioned database further comprises partitioning each bucket into smaller chunks.

14. The system of claim 13, wherein processing the batch of client-encrypted queries comprises executing each query among the batch of client-encrypted queries on each chunk of the bucket, which reduces CPU usage and response time by shrinking a search space for each query execution.

15. A non-transitory computer readable medium storing instructions that, upon execution by a server including one or more processors, cause the server to perform operations comprising:

generating a partitioned database in which a database is partitioned into shards each having a shard identifier that logically distinguishes each shard from other shards, and database entries in each shard are partitioned into buckets having a bucket identifier that logically distinguishes each bucket in the shard from other buckets in the shard;

receiving, from a client device, a batch of client-encrypted queries;

processing the batch of client-encrypted queries using a set of server-encrypted data stored in a database to obtain a set of server-encrypted results to the batch of client-encrypted queries;

determining that the batch of client-encrypted queries includes fake queries and real queries; and transmitting, to the client device, server-encrypted results for the real queries rather than the fake queries.

16. The non-transitory computer readable medium of claim 15, wherein the instructions cause the server to perform operations further comprising:

receiving, from the client device, a set of client-encrypted entity identifiers;

encrypting the set of client-encrypted entity identifiers to create a set of sever-client-encrypted identifiers;

transmitting the set of server-client-encrypted identifiers to the client device.

17. The non-transitory computer readable medium of claim 16, wherein the instructions cause performance of operations further comprising:

generating a set of queries using the set of server-client-encrypted identifiers;

generating a set of decryption keys using the set of server-client-encrypted identifiers;

encrypting the set of queries to create the batch of client-encrypted queries.

18. The non-transitory computer readable medium of claim 17, wherein the instructions cause the server to perform operations further comprising:

encrypting a set of data stored in the database, wherein, for a plurality of entries in the database, each database entry is server-encrypted and is capable of being decrypted by a corresponding decryption key, wherein generating the partitioned database includes assigning each server-encrypted database entry to a bucket.

19. The non-transitory computer readable medium of claim 18, wherein the instructions cause performance of operations further comprising:

applying the set of decryption keys generated by the client device using the set of server-client-encrypted identifiers to the set of server-encrypted results to reveal unencrypted results to the client-encrypted queries.

20. The non-transitory computer readable medium of claim 18, wherein generating the partitioned database further comprises partitioning each bucket into smaller chunks.

* * * * *